(12) United States Patent
Avelar Araujo et al.

(10) Patent No.: US 10,487,730 B2
(45) Date of Patent: Nov. 26, 2019

(54) SLIDING ELEMENT

(71) Applicants: Mahle Metal Leve S/A, Jundiai (BR); Mahle International GmbH, Stuttgart (DE)

(72) Inventors: Juliano Avelar Araujo, Jundiai (BR); Eliel Dos Santos Paes, Jundiai (BR)

(73) Assignees: Mahle Metal Leve S/A (BR); Mahle International GmbH (DE)

( * ) Notice: Subject to any disclaimer, the term of this patent is extended or adjusted under 35 U.S.C. 154(b) by 50 days.

(21) Appl. No.: 15/385,296

(22) Filed: Dec. 20, 2016

(65) Prior Publication Data

US 2017/0175622 A1 Jun. 22, 2017

(30) Foreign Application Priority Data

Dec. 21, 2015 (BR) .......................... 10 2015 032127

(51) Int. Cl.
*C01B 32/00* (2017.01)
*F02B 77/02* (2006.01)
*F16J 9/26* (2006.01)
*F02F 3/10* (2006.01)
*F02F 5/00* (2006.01)

(52) U.S. Cl.
CPC ............. *F02B 77/02* (2013.01); *F02F 3/10* (2013.01); *F02F 5/00* (2013.01); *F16J 9/26* (2013.01)

(58) Field of Classification Search
USPC .................. 428/141, 156, 336, 408, 457
See application file for complete search history.

(56) References Cited

U.S. PATENT DOCUMENTS

| 9,759,322 B2 | 9/2017 | Araujo et al. | |
|---|---|---|---|
| 2009/0026712 A1* | 1/2009 | Kawanishi | F16J 9/26 277/443 |
| 2012/0248711 A1* | 10/2012 | Iwashita | C23C 14/0605 277/440 |
| 2012/0270064 A1* | 10/2012 | Okamoto | C23C 14/024 428/634 |
| 2013/0140776 A1* | 6/2013 | Kennedy | C23C 14/025 277/442 |

(Continued)

FOREIGN PATENT DOCUMENTS

| DE | 102011003254 A1 | 8/2012 |
|---|---|---|
| EP | 3101315 A1 | 12/2016 |

(Continued)

OTHER PUBLICATIONS

Robertson "Diamond-like amorphous carbon" Material ans Sci & Eng R 37 (2002) p. 129-281. (Year: 2002).*

(Continued)

*Primary Examiner* — Archene A Turner
(74) *Attorney, Agent, or Firm* — Fishman Stewart PLLC

(57) ABSTRACT

A sliding element, for example a piston ring for an internal combustion engine, may include a sliding face, an adhesive layer disposed on the sliding face, and a coating disposed over the adhesive layer. The coating may be composed of an amorphous carbon material. The coating may have a ratio between $sp^3$ bonds and $sp^2$ bonds that indicates a predominance of $sp^2$ bonds. The coating may have a roughness profile including a value of Rpk of ≤0.15 µm and a value of Rz of $0.7 \leq Rz \leq 1.5$ µm.

14 Claims, 3 Drawing Sheets

(56) References Cited

U.S. PATENT DOCUMENTS

2016/0003356 A1\* 1/2016 Ozaki .................. F16J 9/26
                                                      277/442
2017/0097065 A1 4/2017 Costa et al.

FOREIGN PATENT DOCUMENTS

| JP | 63-262467 | \* | 10/1998 |
| JP | 2004-116707 | \* | 4/2004 |
| JP | 2006-144100 | \* | 6/2006 |
| JP | 2006-275269 | \* | 10/2006 |
| WO | WO-2013120157 A1 | | 8/2013 |
| WO | 2014/133095 | \* | 9/2014 |
| WO | WO-2015172775 A1 | | 11/2015 |

OTHER PUBLICATIONS

German Search Report dated Sep. 8, 2017 related to corresponding German Patent Application No. 102016224748.4.

\* cited by examiner

SLIDING ELEMENT

CROSS-REFERENCE TO RELATED APPLICATIONS

This application claims priority to Brazilian Patent Application No. 10 2015 032127 9, filed on Dec. 21, 2015, the contents of which is hereby incorporated by reference in its entirety.

TECHNICAL FIELD

The present invention relates to a sliding element, such as a piston ring for internal combustion engines, comprising a coating of hard amorphous carbon provided with a roughness profile capable of promoting a reduction in the friction on the sliding interface, thereof together with reducing the wear.

BACKGROUND

Internal combustion engines, whether Diesel cycle, Otto cycle, two or three stroke, comprise at least a sliding element such as a piston ring.

In this respect, the piston ring acts in the sealing of the space between the cylinder liner and the body of the piston, isolating the combustion chamber from the remaining internal components of the engines. The piston ring is disposed radially upon the base of the body of the piston, preventing the combustion gases from escaping from the combustion chamber in the direction of the crankcase and preventing the oil of the engine from penetrating into the combustion chamber.

Some internal combustion engines, principally engines operating with a Diesel cycle, work under high loads. Other examples may be found in high performance petrol engines. Independently of the examples which may be cited there is a tendency for engines to operate at high speed and high power, with reduced clearances and, consequently, to be subject to severe tribological behaviour. Such conditions are naturally more demanding on the mechanical components thereof. In this respect, the rings utilised in these engines of high power or performance require low friction, high hardness and high wear resistance.

Additionally, it is important to emphasise that the environmental impact of internal combustion engines, when linked to the need for high performance and durability, results, in a general manner, in the requirement to work with closer tolerances, this being, naturally, translated into the utilisation of increasingly thin layers of lubricating oils. As shall be seen hereinafter, the present invention has been specifically developed to offer a solution, the excellent performance whereof flows from the utilisation of predominantly less viscous oils.

The piston rings of the state of the art generally comprise coatings of hard amorphous carbon, also known as DLC (diamond like carbon) or hydrogenated nanostructure of DLC free of hydrogen, as a solution to achieve low friction and high wear resistance.

In general the solutions of the state of the art apply the coating of DLC in a composition incorporating $sp^3$ and $sp^2$ bonds. Nevertheless it should be noted that, by virtue of the high dimensional stability of the $sp^3$ bonds, the hardness thereof exceeds those encountered with the $sp^2$ bonds. For this reason diverse solutions of the state of the art make use of a DLC layer of $sp^3$ (diamond type), coated by a thin layer of $sp^2$ (graphite type).

For a better understanding, the $sp^2$ layer, by virtue of being very soft and lubricant, is utilized to permit the bedding in of the ring within the cylinder liner and preventing the $sp^3$ layer from entering directly into contact with the cylinder liner. Such concern is extremely valid by virtue of the fact that, in addition to the possibility that the $sp^3$ layer may score the cylinder liner, the concentration of stresses present in the $sp^3$ layer is very high such that it may generate disastrous consequences, both for the cylinder liner, scoring it, and for the coating, having the possibility of the occurrence of cracks and the propagation thereof, consequently leading to the diminution of the working life of the engine.

The patent document WO2010133633 reveals a piston ring provided with a DLC coating of the ta-C type having a thickness exceeding 10 micrometers and having at least a residual stress gradient to endow durability and low friction upon the component. It should be noted that the high internal stresses inherent in the deposition of a DLC coating result in the necessity of finding solutions such as those of this document. However, even reducing the residual stress, this solution does not fully resolve the problem, by virtue of the fact that the contact interface of the ring with the liner continues to occur by means of a profile not ensuring, for example, that the cylinder liner does not suffer the wear typical of the solutions of the state of the art.

The document US 2013/0140776 describes a piston ring provided with a DLC coating of the ta-C type having a thickness also exceeding 10 micrometers, wherein the coating contains a finishing layer having a thickness from 1 to 3 micrometers, wherein the quantity of $sp^3$ decreases to values of less than 40% with a view to ensuring that a greater quantity of $sp^2$ is present in this second layer for bedding in the ring within the cylinder.

Whilst the solutions of the state of the art are concerned with ensuring low friction and high durability, all the solutions found require an interface or presence of elements promoting the bedding in, such as a softer layer in the sliding region of the ring, or the addition of metals promoting such effects. In addition, there are alternatives in the state of the art to maintain the functional integrity of the coating, in view of the high stress, through the reduction of the internal stresses whereto the coating is naturally subject by virtue of the high internal stresses and high hardness.

Independently of the efforts revealed by the documents of the prior art, a solution has still not been found generating excellent results in the finished product, that is to say a piston ring not requiring bedding in within in the respective cylinder liner and which, at the same time, works with very small clearances.

Consequently, it is necessary to find a sliding element, such as a piston ring, comprising a coating of hard amorphous carbon of the a-C type provided with a roughness profile capable of promoting a reduction of the friction at the sliding interface thereof, together with diminishing the wear.

SUMMARY

The object of the present invention is to provide a sliding element, such as a piston ring for internal combustion engines, in particular engines operating under high load and/or power, the ring comprising a coating of amorphous carbon provided with a roughness profile capable of promoting a reduction in the friction in the sliding interface thereof, together with diminishing the wear of the cylinder liner, by means of a reduction in the peaks and maximization of the valleys.

It is also an object of the present invention to provide a piston ring provided with a coating capable of working with very small clearances and a thin film of oil having high durability.

It is, furthermore, an object of the present invention to provide a piston ring capable of working with very small clearances and a film of oil.

It is, finally, an object of the present invention to provide a piston ring comprising a hardness in the range from 2000 to 4000 HV (Vickers hardness) which does not score the cylinder liner the hardness whereof is considerably lower, usually less than 700 HV (Vickers hardness) or even 250 to 300 HV.

The objects of the present invention are achieved by a sliding element, in particular a piston ring for internal combustion engines provided with a sliding face whereupon there is deposited, from inside outwards, an adhesive layer and a coating of hard amorphous carbon having a roughness described by the parameters Rpk and Rz such that Rpk≤0.15 µm and 0.7≤Rz≤1.5 µm.

The objects of the present invention are furthermore achieved by an internal combustion engine comprising at least one piston ring as above defined.

BRIEF DESCRIPTION OF THE DRAWINGS

The present invention will, hereinafter, be described in greater detail on the basis of an example of embodiment represented in the drawings. The figures show.

DETAILED DESCRIPTION OF THE DRAWINGS

The present invention relates to a sliding element, in particular a piston ring 10 for internal combustion engines comprising a coating 15 of hard amorphous carbon of the a-C type presenting a roughness profile having Rpk values ≤0.15 µm and 0.7≤Rz≤1.5 µm.

As will be seen hereinbelow, the roughness profile satisfying the values of Rpk and Rz as described above, when utilised in conjunction with a coating of amorphous carbon such as that of the present invention, generates a performance superior to the sliding elements of the state of the art.

At the outset, it should be stated that the sliding element of the present invention is preferentially a piston ring 10 for internal combustion engines operating under high load and/or power. Usually these piston rings 10 work with very small clearances and a thin film of oil to ensure excellent performance and low emissions of $CO_2$.

As principal characteristics, the piston ring 10 of the present invention has as principal characteristics the low friction of a coating 15 based upon a carbon structure having high durability, the result whereof derives from a specially developed topography in the surface of the coating.

Figure 1:
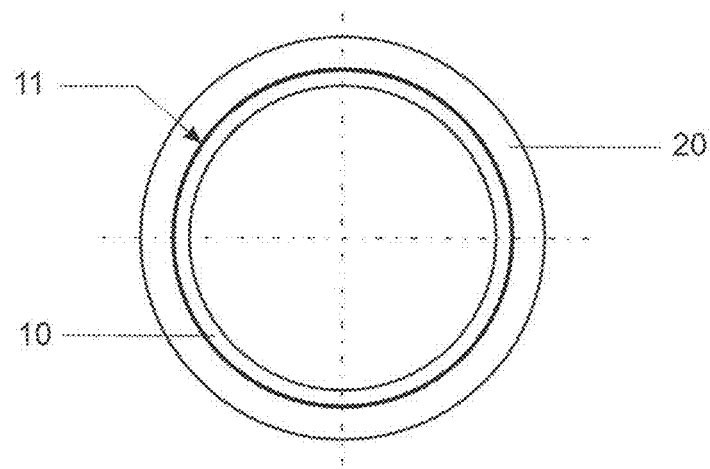
FIG. 1: a representation of the disposition of a piston ring within the interior of a cylinder of an internal combustion engine.

The ring 10 of the present invention, comprising a metal base provided with a sliding face 11, is preferably of cast iron, steel, stainless steel containing from 10% to 17% of chromium or carbon steel. The sliding face 11 is that orientated towards the region of contact with a cylinder liner 20 and it is upon the sliding face 11 that the coating 15 is deposited. In a preferential configuration, the sliding face 11 receives, from inside outwards, an adhesive layer 14 and a coating 15 of hard amorphous carbon of a-C type (see FIGS. 1 and 2).

The adhesive layer 14 has as objective the promotion of the accommodation of the stresses between the metal structure of the ring 10 and the coating 15 of amorphous carbon, the internal stresses whereof are very high, consequently ensuring an excellent adhesion between the functional coating 15 and the metal base. In a preferential manner, however not obligatory, the adhesive layer 14 is formed by a body centered cubic (bcc) polycrystalline columnar structure of chromium, the thickness whereof lies between 0.5 and 1 micrometer. In an alternative preferential configuration, the adhesive layer may be of nickel or cobalt. Furthermore, the adhesive layer 14 is deposited by a vapor deposition process from a metal source.

Figure 2:
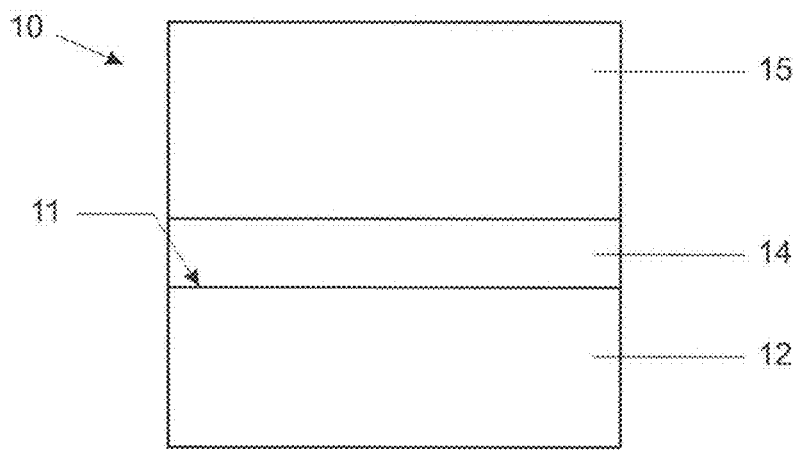
FIG. 2: a cross-section of the piston ring revealing the structure of the coating of the present invention.

In turn, the anti-friction layer, shown in FIG. 2 as coating 15 and hereinafter so designated, is composed of totally amorphous carbon free or substantially free of hydrogen (DLC) having a predominant quantity of $sp^2$. With respect to the absence of hydrogen, it is important to note that the quantity thereof by weight is less than 2%.

In respect of the ratio of $sp^3$ to $sp^2$ it should be noted that, in a preferential configuration, the ratio between $sp^3$ and $sp^2$ comprises $sp^3$ bonds present at between 25% and 40%, characterising the coating 15 of a-C. In other words, in this alternative preferential configuration the ratio of proportions between $sp^3$ and $sp^2$ ranges between 0.25 and 0.45, wherein, in a second alternative preferential configuration, this ratio lies between 0.35 and 0.85. Additionally, the total thickness of the film of the present invention lies between 8 and 15 microns. In an alternative preferential configuration the thickness of the coating 15 ranges between 5000 and 30 000 nanometers.

In respect of the hardness, the coating 15 of amorphous carbon substantially free of hydrogen comprises a hardness lying between 20 and 40 GPa.

It should furthermore be noted that the process of deposition of the coating 15 occurs by a plasma assisted chemical vapour deposition (PACVD) process.

In a manner differing from the automotive solutions of the state of the art, the present invention utilizes a specially developed topography in the contact surface of the coating 15 capable of being adapted to the contact surface 21 of the cylinder liner 20. The development of the present invention has permitted it to be understood that in many situations of tribological contact of sliding and abrasion, the coatings having high roughness yield inferior results.

In this manner, the present invention has as object a piston ring 10 provided with a coating 15 comprising a hardness in the band from 2000 to 4000 HV (Vickers hardness), avoiding however high wear of the cylinder liner 20 the hardness whereof is considerably lower, generally less than 700 HV (Vickers hardness), or even 250 to 300 HV.

In order to achieve the objects of the present invention, the coating 15 of the piston ring 10 comprises a surface having a controlled quantity of valleys with a view to maximizing the supply of oil during the operation of the starting of the engine, also increasing the oil film and reducing the points of solid contact, yielding a lower coefficient of friction in the tribological system (piston ring/cylinder liner).

Contributing greatly to the excellent results of the present invention, the surface of the coating 15 of the present invention comprises a topography the contact whereof with the contact surface 21 of the said cylinder liner 20 occurs principally through plateaus 18.

Figure 3:
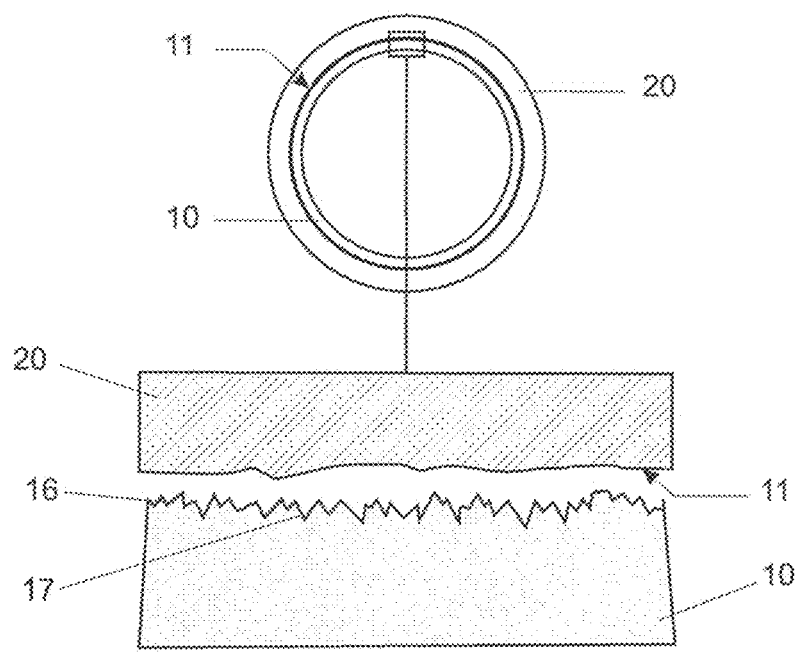
FIG. 3: a drawing representing the points of contact of a cylinder liner and the peaks of a coated piston ring of the state of the art.
Figure 5:
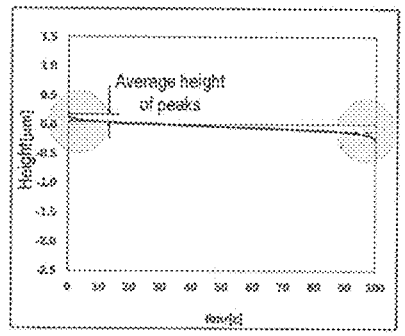
FIG. 5: a graph exemplifying the results from a surface having peaks and valleys of the same magnitude.
Figure 6:
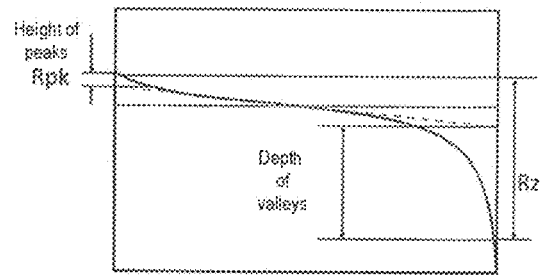
FIG. 6: a graph exemplifying the results from a surface having low peaks and deep valleys.

The standard ISO 4287 defines the roughness parameters Rpk and Rz, representing the average height of the peaks and the average distance from the highest peaks to the deepest valleys. For a better understanding, in terms of an example, a comparison of FIGS. 3 and 5 with FIGS. 4 and 6 permits it to be perceived that, when a given topography comprises many peaks of the same magnitude 16 (see FIGS. 3 and 5), the empty spaces for entry of oil are reduced, rendering difficult the presence of oil in the interface of the piston ring and of the liner. That is to say, rendering difficult the formation of a lubricating film.

In turn, in a topography comprising low peaks and deep valleys the empty spaces are larger and the oil has the possibility of entering into these voids, facilitating the formation of the lubricating film. The formation of this film will prevent the contact between the piston ring and the liner. In other words, the graphs of FIGS. 5 and 6 reveal the surface condition present in this invention. In this type of surface, the percentage of oil between the surfaces is greater, providing favourable conditions for the lubrication, preventing the contact between the sliding element and the liner, reducing both fiction and wear. In this manner, FIGS. 5 and 6 permit the difference between a surface having few and having more oil reservoirs to be comprehended. The present invention makes use of a contact surface very similar to that found in the situation of FIG. 6, that is to say a surface formed substantially by small peaks and large valleys 18, ensuring good support in the region of contact between the piston ring 10 and the cylinder liner 20 and facility in forming the lubricating film.

In this manner, the values of Rpk and Rz are of immense importance to be enabled to characterize the reduced peaks 18 and the presence of deep valleys of the present invention, by virtue of the fact that such values permit the comprehension of the specific topography permitting the obtainment of a solution having low friction, high durability, and reduced wear.

In rings of the state of the art, the difficulty in forming the lubricating film 16 causes the scoring and critical wear of the wall of the cylinder liner 20 by virtue of the high contact pressure. Furthermore, this local high pressure renders difficult the formation and the maintenance of the film of lubricating oil when there is a poor presence of oil between the coating of amorphous carbon free of hydrogen (DLC) and the liner.

Figure 4:
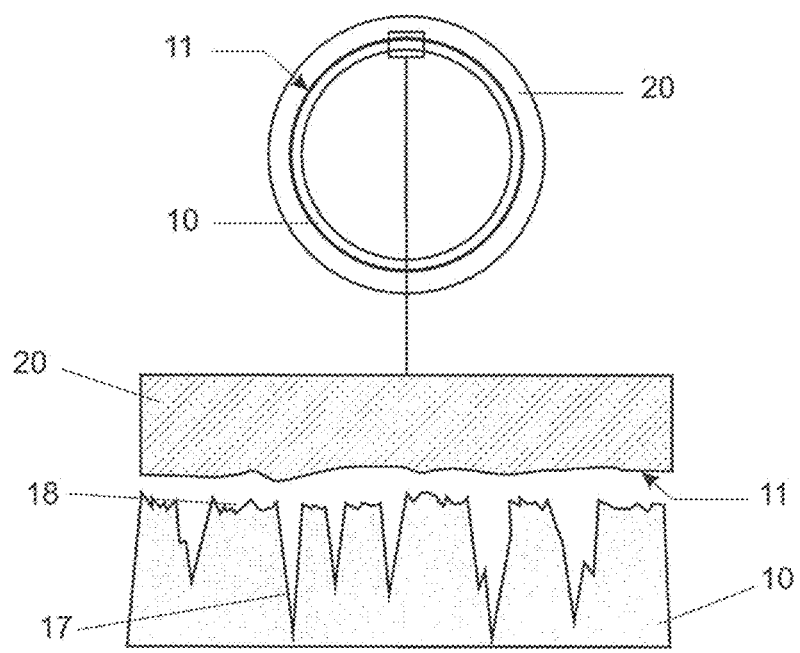
FIG. 4: a drawing representing the points of contact of a cylinder liner and the peaks of a coated piston ring of the present invention.

The solution of the present invention may be described as being similar to that found in FIG. 4. In this manner, to resolve the problems of the state of the art a surface has been developed having the objective of ensuring good support in the contact between the piston ring 10 and the cylinder liner 20 by virtue of the fact of rendering viable the formation of the lubricating film. For the same load, this surface generates little contact when compared with a topography having few oil reservoirs. In this manner, the finish of the piston ring 10 is of immense importance for the realization of the contact between the ring 10 and the liner 20 in order to contribute to the good operation of the engine. The good compatibility between the piston ring 10 and the cylinder liner 20 is obtained by a process of removal of the peaks 16 of the coating 15, this process occurring subsequent to the deposition of the coating 15, without totally eliminating the valleys.

In this respect the present invention has as characteristic of the topography of the coating 15 of the piston ring 10 the fact that the value of Rpk≤0.15 μm and 0.7≤Rz≤1.5 μm. In an alternative preferential mode, the value of Rmr (0.3/0.5) is equal to or exceeds 65%.

Figure 7:
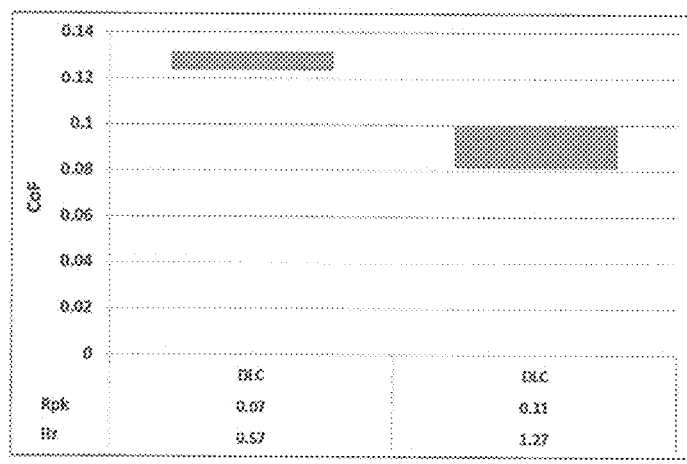
FIG. 7: a graphic representing the results of friction for DLC as a function of the Rpk and Rz values between the state of the art and the present invention.

The laboratory results obtained during the development of the sliding element of the present invention clearly demonstrate the advantages thereof. In this respect, FIG. 7 shows the performance, in terms of friction and wear of the piston ring, as a function of the parameters Rpk and Rz, both for rings of the state of the art and for rings of the present invention. It should be noted that for the invention the tests were carried out with values of Rpk and Rz within the specification.

The results of FIG. 7 show that the coatings of amorphous carbon substantially free of hydrogen and the coating of chromium nitride present different levels of Rpk and Rz. The coefficient of friction of the carbon coatings presents a reduction when compared with the Rpk and Rz of the state of the art. In turn, the values furthest to the right in the table of FIG. 7 reveal that the coating of the present invention of DLC and the coating of CrN present substantially the same Rmr values. Furthermore, the coating of DLC of the present invention presents a coefficient of friction substantially 25% lower than the coating of CrN.

Figure 8:
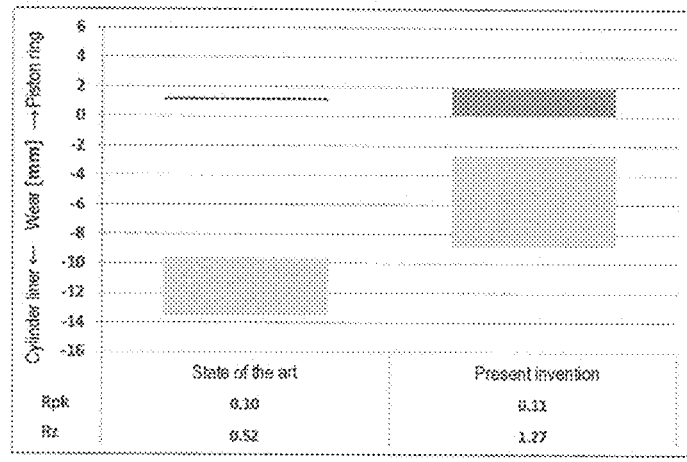
FIG. 8: a graphic representing the wear of the DLC rings and of the cylinder liner for the present invention and the state of the art.

FIG. 8 furthermore shows the performance in terms of the wear of the coating of DLC of the present invention compared with a coating of DLC of the state of the art. The results demonstrate the advantage of the solution of the present invention by virtue of the revelation thereby that the presence of oil reservoirs of the present invention brings about less wear on the piston ring 10 (columns above zero) and less wear on the cylinder liner 20 (columns below zero). In other words, for amorphous carbon coatings, when the Rmr values attain the topographical profile of the present invention the wear is much lower both of the piston ring 10 and of the cylinder liner 20.

Consequently, no doubts remain that the present invention, on combining the use of coatings 15 of amorphous carbon substantially free of hydrogen having a topology presenting oil reservoirs facilitating the formation of a lubricating film preventing the contact with the liner, the coefficient of friction is greatly reduced and the wear, both of the ring and of the cylinder, is also reduced, ensuring the correct behaviour at any stage of operation of the engine and ensuring a long life for the engines.

An example of preferred embodiment having been described, it shall be understood that the scope of the present invention covers other possible variations, being limited solely by the content of the appended claims, therein included the possible equivalents.

The invention claimed is:

1. A sliding element comprising:
    a sliding face;
    an adhesive layer disposed on the sliding face; and
    a coating of amorphous carbon disposed over the adhesive layer;

wherein the coating has a ratio between $sp^3$ and $sp^2$ bonds that indicates a predominance of $sp^2$ bonds and a roughness profile including a Rmr(0.3/0.5) of 65% or greater and at least one of: (i) a value of Rpk of 0.15 μm, and (ii) a value of Rz of 0.7 Rz 1.5 μm; and wherein a contact surface of the coating has a peak and valley structure defining a plurality of plateaus facilitating contact between the sliding surface and a peripheral surface.

2. The sliding element according to claim 1, wherein the coating contains less than 2% by weight of hydrogen.

3. The sliding element according to claim 1, wherein the coating of amorphous carbon is of an a-C type and the ratio between $sp^3$ and $sp^2$ bonds includes a value of $sp^3$ bonds of between approximately 25% and 45%.

4. The sliding element according to claim 1, wherein the roughness profile of the coating has the value of Rpk of 0.15 μm and the value of Rz of 0.7 Rz 1.5 μm.

5. The sliding element according to claim 1, wherein the coating has a thickness that exceeds 8 micrometers.

6. The sliding element according to claim 1, wherein the coating has a thickness between 8 micrometers and 15 micrometers.

7. The sliding element according to claim 1, wherein the adhesive layer includes at least one of a chromium metal having a body centred cubic structure, a nickel material and a cobalt material.

8. The sliding element according to claim 1, wherein the coating has a hardness ranging between 20 and 40 GPa.

9. The sliding element according to claim 1, wherein the sliding surface includes a base stainless steel material having approximately 10% to 17% chromium, and a remainder of cast iron and carbon.

10. The sliding element according to claim 1, wherein the adhesive layer includes a chromium metal having a body centred cubic polycrystalline columnar structure.

11. The sliding element according to claim 1, wherein the coating has a thickness between 5 micrometers and 8 micrometers.

12. The sliding element according to claim 1, wherein the coating is a plasma assisted chemical vapour deposition coating.

13. The sliding element according to claim 1, further comprising a plurality of plateau peaks projecting from the plurality of plateaus and defining a plurality of plateau valleys.

14. A sliding element for an internal combustion engine, comprising:

a sliding face;

a metal adhesive layer disposed on the sliding face; and a coating of a hydrogen-free amorphous carbon material disposed over the adhesive layer;

wherein the coating has a ratio of $sp^a$ to $sp^2$ bonds that ranges between 0.25 and 0.45, and a roughness profile including a Rmr(0.3/0.5) of 65% or greater, a value of Rpk of 0.15 μm or less, and a value of Rz ranging from 0.7 to 1.5 μm; and wherein a contact surface of the coating has a peak and valley structure defining a plurality of plateaus facilitating contact between the sliding surface and a peripheral surface.

* * * * *

UNITED STATES PATENT AND TRADEMARK OFFICE
CERTIFICATE OF CORRECTION

PATENT NO. : 10,487,730 B2
APPLICATION NO. : 15/385296
DATED : November 26, 2019
INVENTOR(S) : Avelar Araujo et al.

Page 1 of 1

It is certified that error appears in the above-identified patent and that said Letters Patent is hereby corrected as shown below:

In the Claims

At Column 8, Claim number 14, Line number 22, please change "$sp^{\alpha}$" to "$sp^3$".

Signed and Sealed this
Twenty-first Day of July, 2020

Andrei Iancu
*Director of the United States Patent and Trademark Office*